United States Patent [19]
Bolze et al.

[11] Patent Number: 4,996,290
[45] Date of Patent: Feb. 26, 1991

[54] POLYESTER AMIDES CONTAINING IMIDE GROUPS, PROCESS FOR THEIR PRODUCTION AND THEIR USE AS HOT-MELT ADHESIVES

[75] Inventors: Manfred Bolze, Bergkamen-Oberaden; Manfred Drawert, Fröndenberg, both of Fed. Rep. of Germany

[73] Assignee: Schering AG, Berlin and Bergkamen, Fed. Rep. of Germany

[21] Appl. No.: 486,523

[22] Filed: Feb. 28, 1990

[30] Foreign Application Priority Data

Mar. 18, 1989 [DE] Fed. Rep. of Germany ....... 3909051

[51] Int. Cl.$^5$ .............................................. C08G 63/02
[52] U.S. Cl. .................................... 528/272; 528/295.3; 528/295.5; 528/296; 528/302; 528/303; 528/306; 528/307; 528/308; 528/308.6; 528/332; 528/335; 528/339.5
[58] Field of Search ............... 528/272, 295.3, 295.5, 528/296, 302, 303, 306, 307, 308, 308.6, 332, 335, 339.5

[56] References Cited

U.S. PATENT DOCUMENTS

| | | | |
|---|---|---|---|
| 3,652,471 | 3/1972 | Sattler | 260/22 R |
| 4,307,002 | 12/1981 | Wagner et al. | |
| 4,375,528 | 3/1983 | Lange | 524/538 |
| 4,440,900 | 4/1984 | Burba et al. | 524/569 |
| 4,505,986 | 3/1985 | Geerdes et al. | 428/481 |
| 4,514,540 | 4/1985 | Peck | 524/514 |
| 4,732,966 | 3/1988 | Wilson | 529/339.3 |

FOREIGN PATENT DOCUMENTS

| | | |
|---|---|---|
| 1280852 | 10/1968 | Fed. Rep. of Germany . |
| 1443968 | 5/1969 | Fed. Rep. of Germany . |
| 1443938 | 6/1969 | Fed. Rep. of Germany . |
| 2118702 | 10/1972 | Fed. Rep. of Germany . |
| 1352476 | 5/1974 | United Kingdom . |

Primary Examiner—John Kight, III
Assistant Examiner—S. A. Acquah
Attorney, Agent, or Firm—Curtis, Morris & Safford

[57] ABSTRACT

The invention relates to polyester amide imides produced by condensation of a dimerized fatty acid, and optionally straight-chain aliphatic and/or aromatic dicarboxylic acids having from 6 to 13 carbon atoms, trimellitic anhydride, aliphatic diamines having from 2 to 12 carbon atoms, and either a mixture of isomers of 3,8-dihydroxymethyltricyclo[5.2.1.0$^{2,6}$]decane 3,9-dihydroxymethyltricylo[5.2.1.0$^{2,6}$]decane 4,9-dihydroxymethyltricyclo-[5.2.1.0$^{2,6}$]decane, 4,8-dihydroxymethyltricyclo[5.2.1.0$^{2,6}$]decane and/or 1,4-dihydroxymethylcyclohexane.

8 Claims, No Drawings

POLYESTER AMIDES CONTAINING IMIDE GROUPS, PROCESS FOR THEIR PRODUCTION AND THEIR USE AS HOT-MELT ADHESIVES

The present invention relates to polyester amide imides produced by condensation of a dimerized fatty acid and optionally straight-chain aliphatic and/or aromatic dicarboxylic acids having from 6 to 13 carbon atoms, trimellitic anhydride, aliphatic diamines having from 2 to 12 carbon atoms, and either a mixture of isomers of 3,8-dihydroxymethyltricyclo[5.2.1.0$^{2,6}$]decane 3,9-dihydroxymethyltricylo[5.2.1.0$^{2,6}$]decane 4,9-dihydroxymethyltricyclo[5.2.1.0$^{2,6}$]decane, 4,8-dihydroxymethyltricyclo[5.2.1.$^{2,6}$]decane and/or 1,4-dihydroxymethylcyclohexane.

Hot-melt adhesives based on polyester amides have a more or less pronounced tendency to absorb moisture, which may be taken up from the air during the granulating operation or during storage.

This is true even of hot-melt adhesives in the production of which long-chain hydrophobic mono- or polybasic fatty acids or fatty mono- or polyamines were also used.

The amount of moisture taken up by these hot-melt adhesives usually ranges from about 0.1 to 3 percent by weight, but mostly from about 0.3 to 1 percent by weight. Even when minor amounts of moisture are absorbed, processing by means of the melting and application equipment commonly used in the hot-melt adhesive field gives rise to considerable foaming, which greatly interferes with the flow in the applicator and with satisfactory application of the hot-melt adhesive.

Moreover, bubbles trapped in the glue line during cooling can reduce both cohesion and adhesion.

In practice, appropriate precautionary measures must therefore be adopted especially so far as the granulating operation and packaging are concerned. As a rule, polyethylene film or sheeting, aluminum foil and moisture-sealed paper are used as moisture-tight packaging materials.

However, moisture may be nevertheless absorbed when working in the field if containers that have already been opened have to be stored. In their directions for use, manufacturers point this problem out to their customers and recommend that open containers be either tightly sealed or their contents be used up quickly.

The present invention has as its object to overcome these drawbacks of the prior art and to provide hot-melt adhesives which when melted and used in the delivery and application equipment commonly employed will not tend to foam.

This object is accomplished through the hot-melt adhesives based on polyester amide imides in accordance with the invention.

The present invention thus relates to polyester amide imides produced by condensation of (1) from 0.1 to 0.95 equivalent of a dimerized fatty acid, and optionally
(2) from 0 to 0.85 equivalent of straight-chain aliphatic and/or aromatic dicarboxylic acids having from 6 to 13 carbon atoms,
(3) from 0.05 to 0.5 equivalent of trimellitic anhydride,
(4) from 0.5 to 0.7 equivalent of even-numbered aliphatic diamines having from 2 to 12 carbon atoms, and
(5) from 0.3 to 0.6 equivalent of either a mixture of isomers of 3,8-dihydroxymethyltricyclo[5.2.1.0$^{2,6}$]decane 3,9-dihydroxymethyltricylo[5.2.1.0$^{2,6}$]decane 4,9-dihydroxymethyltricyclo[5.2.1.0$^{2,6}$]decane, 4,8-dihydroxymethyltricyclo[5.2.1.$^{2,6}$]decane and/or 1,4-dihydroxymethylcyclohexane.

The invention further relates to a process for the production of these polyester amide imides by condensation of their components under conditions which are known per se.

The invention relates, moreover, to the use of these polyester amide imides as hot-melt adhesives, coating and casting compositions.

After being stored in air under normal conditions even for a period of several months, the polyester amide imides of the invention show no tendency to foam when fluidized and used in the melting and application equipment commonly employed in the hot-melt adhesive field. Moreover, they exhibit good gasoline and oil resistance as well as excellent adhesion to rubber, polyvinyl chloride, acrylonitrile-butadiene-styrene copolymers, fiber-reinforced plastics and metals such as iron, copper, aluminum or zinc. Since they have little tendency to aftercrystallize, their initial adhesive strength is not likely to diminish.

The dimeric fatty acids also used in the production of these polyester amide imides have dimer contents ranging from 55 to 100 percent, and preferably from 70 to 96 percent.

The term "dimerized fatty acid" is applied in a general way to polymerized acids obtained from fatty acids. The term "fatty acid" is applied to unsaturated natural and synthetic monobasic aliphatic acids having from 8 to 22 carbon atoms, and preferably 18 carbon atoms. These fatty acids can be polymerized by conventional methods. (See published unexamined German patent applications 14 43 938 and 14 43 968 and German patents Nos. 21 18 702 and 12 80 852.)

Typical commercially available polymeric fatty acids have approximately the following composition:

| Monomeric acids | 5 to 15 percent by weight |
|---|---|
| Dimeric acids | 55 to 80 percent by weight |
| Trimeric acids | 10 to 35 percent by weight |

The dimeric acid content can be increased up to 100 percent by weight by generally known distillation methods.

The dimeric fatty acid may also be used in hydrogenated form.

When a hydrogenated dimeric fatty acid is used, hot-melt adhesives having a better color index are obtained. Moreover, commercial technical polymerized fatty acids may be used to produce hot-melt adhesives for special purposes. However, it should be noted that when technical dimeric fatty acids are used, the trimeric fatty acid content should not exceed a limit which depends on the content of dimeric and monomeric fatty acids of the polymerized fatty acid, and which can be determined by trial and error, as practiced routinely by the average person skilled in the art.

Preferably, however, a distilled dimeric fatty acid containing from 70 to 96 percent of dimeric fatty acid is used.

With a total acid equivalent of 1.0, the dimeric fatty acids are used in amounts of from 0.10 to 0.95, and preferably from 0.3 to 0.6, equivalent.

The dicarboxylic acids which in accordance with the invention can also be used have the general formula $$R^2-OOC-R^1-COOR^2 \quad (I),$$

where $R^1$ may be a straight-chain aliphatic, a cycloaliphatic, aromatic or araliphatic hydrocarbon group having from 4 to 11 carbon atoms, and $R^2$ may be hydrogen or an alkyl group having from 1 to 8 carbon atoms.

These acids may be used alone or in a mixture in amounts of from 0 to 0.85, and preferably from 0.3 to 0.6, equivalent, based on a total acid equivalent of 1.0.

Examples are adipic acid, pimelic acid, suberic acid, azelaic acid, sebacic acid, decamethylenedicarboxylic acid, brassylic acid, 1,4-cyclohexanedicarboxylic acid, terephthalic acid, isophthalic acid, naphthalinedicarboxylic acid and 1,4-phenylenediacetic acid. In accordance with the invention, adipic acid, azelaic acid, sebacic acid, decamethylenedicarboxylic acid and terephthalic acid are preferred.

Trimellitic acid or trimellitic anhydride, which in accordance with the invention is also used, are both commercial products and are used in amounts of from 0.05 to 0.5, and preferably from 0.05 to 0.2, equivalent, based on a total acid equivalent of 1.0. Since these components as imide formers act difunctionally, this is also the basis for calculation of the amounts to be used.

Suitable for use as amino component which in accordance with the invention is also to be used are diamines of the general formula $$H_2N-R^3-NH_2 \quad (II),$$

where $R^3$ is an even-numbered aliphatic hydrocarbon group having from 2 to 12, and preferably from 2 to 6, carbon atoms, and particularly unsubstituted amines such as 1,2-diaminoethane, 1,4-diaminobutane, 1,6-diaminohexane, 1,8-diaminooctane and 1,12-diaminododecane. In accordance with the invention, 1,2-diaminoethane and 1,6diaminohexane are preferred. These amines may be used alone or in a mixture in amounts of from 0.4 to 0.7, and particularly from 0.5 to 0.6, equivalent.

As hydroxyl component, 1,4-dihydroxymethylcyclohexane and/or a mixture of isomers of 3,8-dihydroxymethyltricyclo[5.2.1.0$^{2,6}$]decane 3,9-dihydroxymethyltricylo[5.2.1.0$^{2,6}$]decane 4,9-dihydroxymethyltricyclo[5.2.1.0$^{2,6}$], 4,8-dihydroxymethyltricyclo[5.2.1.0$^{2,6}$]-decane is or are also used, in accordance with the invention, in amounts of from 0.3 to 0.6, and preferably from 0.4 to 0.5, equivalent. The sum of the total amino equivalents and total hydroxyl equivalents is 1.0.

The nature and amount of the amino and hydroxyl components which are also used may be varied over a relatively broad range. Taking into account the various factors which come into play, and which are generally known to those skilled in the art of hot-melt adhesives, resins having the desired softening points, the required melt viscosities or the desired rates of set, for example, can be produced selectively.

The sum of the equivalents of the carboxyl groups being used according to (1), (2) and (3) is substantially equal to the sum of the amino and hydroxyl groups according to (4) and (5), a slight excess of acid being preferred in accordance with the invention, so that there will be from 1.02 to 1.05 equivalents of components (1), (2) and (3) for 1.0 equivalent of components (4) and (5).

The condensation of the aforesaid components to the inventive polyester amide imides is carried out at temperatures ranging from 200 to 300° C. by methods generally known in this field.

The polyester amide imides of the invention, optionally in admixture with additive and auxiliary substances commonly used in this field, such as extenders and flow-control agents, dyes, pigments and stabilizers, as well as compatible polymers or copolymers which have no tendency to foam, can be used for the bonding or coating of inorganic or organic substrates such as metals, metal foils, glass, ceramics, paper, rubber, leather, textiles and plastics such as polyvinyl chloride (PVC), acrylonitrile-butadiene-styrene (ABS) or ethylene-propylene terpolymer (EPDM), and as casting compositions.

TESTS FOR FOAMING

From the inventive polyamide imides, so-called sticks, that is, cylinders 12 mm in diameter and 10 cm long, were produced by pouring a bubble-free melt of 200° C into appropriate molds made of Teflon ®. Cooling and removal of the sticks from the mold were followed by open storage at 22 ±2° C. and 50 percent relative humidity for a period of six months.

The sticks were then melted in a commercial glue gun.

Evaluation: The molten adhesive is transparent when free of bubbles, and bubbles can therefore be readily spotted.

Foaming is said to occur when there is a large number of bubbles in the extruded hot-melt adhesive bead.

No foaming is said to occur when the extruded melt is free, or nearly free, of bubbles.

The evaluation was based on five sticks in each case.

The testing procedure was the same in the case of the comparative examples.

The dimeric fatty acids used in the examples which follow had the following composition, as determined by gas-liquid chromatography (GLC):

| Examples | Polymerized tall-oil fatty acid | |
|---|---|---|
| for A | Monomeric fatty acid | 6.71% |
|  | Dimeric fatty acid | 90.25% |
|  | Trimeric and higher-polymeric fatty acid | 3.04% |
| for B | Monomeric fatty acid | 10.5% |
|  | Dimeric fatty acid | 74.3% |
|  | Trimeric and higher-polymeric fatty acid | 15.5% |

EXAMPLES

Example 1

In a one-liter three-necked flask equipped with stirrer, thermometer and downward condenser, 400 g of dimerized tall-oil fatty acid (A) (0.95 equivalent), 7.1 g of trimellitic anhydride (0.05 equivalent), 26.15 g of ethylenediamine (0.588 equivalent) and 41.74 g of 1,4-dihydroxymethylcyclohexane (0.392 equivalent) were mixed under nitrogen and heated over 2 hours to 250° C.

This temperature was maintained for 6 hours, the pressure being reduced to 5–7 millibars during the last 4 hours. The polyester amide imide obtained had a softening point of 88° C., as determined by the ring-and-ball method (DIN 52,011), a viscosity of 0.52 Pa.s, as determined at 200° C on the basis of DIN 53,019 with a rotational viscometer made by Haake, an acid value of 7.5, and an amine value of 1.7.

No foaming occurred when the stored resins were melted in a hot-melt glue gun.

The examples listed in the table were carried out in the same manner. The amounts of the components are given in terms of equivalents, and the amounts of the amino and hydroxyl equivalents should be multiplied by a factor of 0.98.

| Key to abbreviations used in the Table | |
|---|---|
| AdpA | = Adipic acid |
| AzlA | = Azelaic acid |
| CPTA | = Cyclopentanetetracarboxylic acid, dianhydride |
| $C_{12}A$ | = Decamethylenedicarboxylic acid |
| $C_{12}D$ | = 1,12-Diaminododecane |
| DiFA | = Dimeric fatty acid; example as indicated |
| DMCH | = 1,4-Dihydroxymethylcyclohexane |
| DMT | = Dimethyl terephthalate |
| EDA | = Ethylenediamine |
| HDA | = Hexamethylenediamine |
| SebA | = Sebacic acid |
| R + B SP | = Ring-and-ball softening point |
| TCD | = a mixture of isomers of 3,8-Dihydroxymethyltricyclo[5.2.1.0$^{2,6}$]decane, 3,9-dihydroxymethyltricyclo[5.2.1.0$^{2,6}$]decane 4,9-dihydroxymethyltricyclo[5.2.1.0$^{2,6}$]decane, 4,8-dihydroxymethyltricyclo[5.2.1.0$^{2,6}$]decane |
| TmAn | = Trimellitic anhydride |
| Visc 200° | = Melt viscosity, as measured at 200° C., in Pa.s |

TABLE

| | DiFA | | Carboxylic acid | | TmAn | Amino component | | Hydroxyl component | | Amine value | Acid value | R + B SP °C. | Visc 200° Pa.s | Foaming |
|---|---|---|---|---|---|---|---|---|---|---|---|---|---|---|
| Example | | | | | | | | | | | | | | |
| 1 | 0.95 | A | — | | 0.05 | EDA | 0.6 | DMCH | 0.4 | 1.7 | 7.5 | 88 | 0.52 | No |
| 2 | 0.05 | A | — | | 0.05 | HDA | 0.6 | DMCH | 0.3 | 0 | 4.5 | 80 | 1.08 | No |
| | | | | | | | | TCD | 0.1 | | | | | |
| 3 | 0.3 | A | $C_{12}A$ | 0.6 | 0.10 | $C_{12}D$ | 0.4 | TCD | 0.6 | 0 | 3.3 | 118 | 2.31 | No |
| 4 | 0.15 | B | AdpA | 0.8 | 0.05 | HDA | 0.5 | DMCH | 0.5 | 0.6 | 7.2 | 192 | 25.0 | No |
| 5 | 0.45 | A | AdpA | 0.2 | 0.05 | HDA | 0.5 | DMCH | 0.5 | 0 | 8.3 | 132 | 3.5 | No |
| | | | SebA | 0.3 | | | | | | | | | | |
| 6 | 0.45 | A | SebA | 0.5 | 0.05 | EDA | 0.3 | DMCH | 0.5 | 3.4 | 4.1 | 136 | 8.0 | No |
| | | | | | | $C_{12}D$ | 0.2 | | | | | | | |
| 7 | 0.4 | A | $C_{12}A$ | 0.3 | 0.30 | HDA | 0.7 | DMCH | 0.3 | 0.4 | 5.4 | 129 | 26.0 | No |
| 8 | 0.7 | A | DMT | 0.1 | 0.20 | HDA | 0.5 | DMCH | 0.5 | 0.8 | 4.3 | 93 | 1.01 | No |
| 9 | 0.3 | A | SebA | 0.2 | 0.50 | HDA | 0.7 | DMCH | 0.3 | 1.3 | 6.1 | 113 | 29.2 | No |
| 10 | 0.45 | A | AzlA | 0.5 | 0.05 | HDA | 0.5 | DMCH | 0.5 | 0.7 | 7.6 | 138 | 3.2 | No |
| Comparative examples | | | | | | | | | | | | | | |
| 11 | 0.50 | A | AzlA | 0.5 | — | HDA | 0.5 | DMCH | 0.5 | 0.8 | 6.1 | 144 | 1.6 | Yes |
| 12 | 0.45 | A | SebA | 0.5 | 0.05 (CPTA) | HDA | 0.5 | DMCH | 0.5 | 2.5 | 6.4 | 151 | 7.0 | Yes |
| 13 | 0.40 | A | $C_{12}A$ | 0.3 | 0.30 (CPTA) | HDA | 0.7 | DMCH | 0.3 | 0 | 6.7 | 128 | 14.3 | Yes |
| 14 | 0.45 | A | SebA | 0.45 | 0.10 (CPTA) | HDA | 0.7 | DMCH | 0.3 | 3.4 | 5.7 | 161 | 15.0 | Yes |

We claim:

1. Polyester amide imides produced by condensation of
   (1) from 0.1 to 0.95 equivalent of a dimerized fatty acid, and optionally
   (2) from 0 to 0.85 equivalent of straight-chain aliphatic and/or aromatic dicarboxylic acids having from 6 to 13 carbon atoms,
   (3) from 0.05 to 0.5 equivalent of trimellitic anhydride,
   (4) from 0.5 to 0.7 equivalent of even-numbered aliphatic diamines having from 2 to 12 carbon atoms, and
   (5) from 0.3 to 0.6 equivalent of either a mixture of isomers of 3,8-dihydroxymethyltricyclo[5.2.1.0$^{2,6}$]-decane 3,9-dihydroxymethyltricylo[5.2.1.0$^{2,6}$]decane 4,9-dihydroxymethyltricyclo[5.2.1.0$^{2,6}$]decane, 4,8-dihydroxymethyltricyclo[5.2.1.$^{2,6}$]decane and-/or 1,4-dihydroxymethylcyclohexane.

2. Polyester amide imides as defined in claim 1, characterized in that adipic acid, sebacic acid, azelaic acid, decamethylenedicarboxylic acid and/or terephthalic acid are used as dicarboxylic acids.

3. Polyester amide imides as defined in claim 1, characterized in that 1,2-diaminoethane and/or 1,6-diaminohexane and/or 1,12-diaminodecane are used as aliphatic diamines.

4. Polyester amide imides as defined in claim 1, characterized in that from 0.3 to 0.6 equivalent of dimerized fatty acid, from 0.3 to 0.6 equivalent of dicarboxylic acid, from 0.05 to 0.2 equivalent of trimellitic anhydride, from 0.5 to 0.6 equivalent of the amino component and from 0.4 to 0.5 equivalent of the hydroxyl component are used.

5. A process for the production of polyester amide imides by condensation of
   (1) from 0.5 to 0.95 equivalent of a dimerized fatty acid, and optionally
   (2) from 0 to 0.85 equivalent of straight-chain aliphatic and/or aromatic dicarboxylic acids having from 6 to 13 carbon atoms, (3) from 0.05 to 0.5 equivalent of trimellitic anhydride, (4) from 0.5 to 0.7 equivalent of even-numbered aliphatic diamines having from 2 to 12 carbon atoms, and (5) from 0.3 to 0.6 equivalent of either a mixture of isomers of 3,8-dihydroxymethyltricyclo[5.2.1.0$^{2,6}$]-decane 3,9-dihydroxymethyltricylo[5.2.1.0$^{2,6}$]decane 4,9-dihydroxymethyltricyclo[5.2.1.0$^{2,6}$]decane, 4,8-dihydroxymethyltricyclo[5.2.1.2$^{,6}$]decane and/or 1,4-dihydroxymethylcyclohexane.

6. A process for the production of polyester amide imides as defined in claim 5, characterized in that (1) from 0.3 to 0.6 equivalent of dimerized fatty acid, and optionally (2) from 0.3 to 0.6 equivalent of adipic acid, sebacic acid, azelaic acid, decamethylenedicarboxylic acid and/or terephthalic acid, (3) from 0.05 to 0.2 equivalent of trimellitic anhydride, (4) from 0.5 to 0.6 equivalent of 1,2-diaminoethane and/or 1,6diaminohexane and/or 1,12-diaminododecane, and (5) from 0.4 to 0.5 equivalent of either a mixture of isomers of 3,8-dihydroxymethyltricyclo[5.2.1.0$^{2,6}$]-decane 3,9-dihydroxymethyltricylo[5.2.1.0$^{2,6}$]decane 4,9-dihydroxymethyltricyclo[5.2.1.0$^{2,6}$]decane, 4,8-dihydroxymethyltricyclo[5.2.1.2$^{,6}$]and/or 1,4-dihydroxymethylcyclohexane are condensed.

7. The use of polyester amide imides produced by condensation of (1) from 0.1 to 0.95 equivalent of a dimerized fatty acid, and optionally (2) from 0 to 0.85 equivalent of straight-chain aliphatic and/or aromatic dicarboxylic acids having from 6 to 13 carbon atoms, (3) from 0.05 to 0.5 equivalent of trimellitic anhydride, (4) from 0.05 to 0.7 equivalent of even-numbered aliphatic diamines having from 2 to 12 carbon atoms, and (5) from 0.3 to 0.6 equivalent of either a mixture of isomers of 3,8-dihydroxymethyltricyclo[5.2.1.0$^{2,6}$]-decane 3,9-dihydroxymethyltricylo[5.2.1.0$^{2,6}$]decane 4,9-dihydroxymethyltricyclo[5.2.1.0$^{2,6}$]decane, 4,8-dihydroxymethyltricyclo[5.2.1.2$^{,6}$]decane and/or 1,4-dihydroxymethylcyclohexane as hot-melt adhesives for the bonding and coating of inorganic and organic substrates and as casting compositions.

8. The use of polyester amide imides produced by condensation of (1) from 0.3 to 0.6 equivalent of a dimerized fatty acid, and optionally (2) from 0.3 to 0.6 equivalent of adipic acid, sebacic acid, azelaic acid, decamethylenedicarboxylic acid and/or terephthalic acid, (3) from 0.05 to 0.2 equivalent of trimellitic anhydride, (4) from 0.5 to 0.6 equivalent of 1,2-diaminoethane and/or 1,6-diaminohexane and/or 1,12-diaminododecane, and (5) from 0.4 to 0.5 equivalent of either a mixture of isomers of 3,8-dihydroxymethyltricyclo[5.2.1.0$^{2,6}$]-decane 3,9-dihydroxymethyltricylo[5.2.1.0$^{2,6}$]decane 4,9-dihydroxymethyltricyclo[5.2.1.0$^{2,6}$]decane, 4,8-dihydroxymethyltricyclo[5.2.1.2$^{,6}$]decane and/or 1,4-dihydroxymethylcyclohexane as hot-melt adhesives for the bonding and coating of inorganic and organic substrates and as casting compositions.

* * * * *